United States Patent
Van Swam

(10) Patent No.: US 6,519,309 B1
(45) Date of Patent: Feb. 11, 2003

(54) PRESSURIZED WATER REACTOR FUEL ASSEMBLY SPACER GRID

(75) Inventor: Leonard F. P. Van Swam, Richland, WA (US)

(73) Assignee: Framatone ANP Inc., Lynchburg, VA (US)

( * ) Notice: Subject to any disclaimer, the term of this patent is extended or adjusted under 35 U.S.C. 154(b) by 0 days.

(21) Appl. No.: 09/607,038

(22) Filed: Jun. 29, 2000

(51) Int. Cl.$^7$ .................................. G21C 3/34
(52) U.S. Cl. .................. 376/442; 376/438; 376/439; 376/441; 376/443; 376/453; 376/454; 376/462
(58) Field of Search ................... 376/442, 444, 376/462, 441, 438, 439, 443, 453, 454

(56) References Cited

U.S. PATENT DOCUMENTS

| | | | | |
|---|---|---|---|---|
| 3,687,805 A | * | 8/1972 | Desbois | 376/436 |
| 3,813,288 A | * | 5/1974 | Leaver et al. | 376/442 |
| 3,820,226 A | * | 6/1974 | Nakazato | 29/428 |
| 4,297,170 A | * | 10/1981 | Leclercq | 376/442 |
| 4,324,618 A | | 4/1982 | Schluderberg | 376/434 |
| 4,547,335 A | * | 10/1985 | Downs et al. | 376/462 |
| 4,684,496 A | * | 8/1987 | Wilson et al. | 210/521 |
| 4,726,926 A | * | 2/1988 | Patterson et al. | 376/261 |
| 4,756,878 A | | 7/1988 | King et al. | 376/439 |
| 4,758,403 A | * | 7/1988 | Noailly | 376/439 |
| 4,849,161 A | * | 7/1989 | Brown | 367/439 |
| 4,879,090 A | * | 11/1989 | Perrotti et al. | 376/439 |
| 5,174,950 A | * | 12/1992 | Cachat | 376/462 |
| 5,188,798 A | * | 2/1993 | Okuyama et al. | 376/442 |
| 5,259,009 A | * | 11/1993 | Patterson et al. | 376/439 |
| 5,278,883 A | | 1/1994 | Patterson et al. | 376/439 |
| 5,345,487 A | * | 9/1994 | Johansson | 376/438 |
| 5,434,898 A | | 7/1995 | Barkhurst | 376/438 |
| 5,625,657 A | * | 4/1997 | Gallacher | 376/261 |
| 6,130,927 A | * | 10/2000 | Kang et al. | 376/439 |

* cited by examiner

*Primary Examiner*—Charles T. Jordan
*Assistant Examiner*—Stephen A Holzen
(74) *Attorney, Agent, or Firm*—Kenyon & Kenyon

(57) ABSTRACT

A spacer grid for PWR assemblies is characterized by curved flow channels between adjacent fuel rods and straight, essentially flat strips connecting opposite side plates of the spacer. The latter strips prevent bowing-out of the side plates during fuel assembly fabrication and during operation in the reactor. Additionally, the spacer grid allows accurate positioning of the fuel rods on a square lattice with a precisely defined pitch, and support of the rods in their spacer cells is such that rod bow will be minimized. The direction of the nozzles on the flow channels has been chosen to promote cross-flow of the coolant through the assembly.

2 Claims, 9 Drawing Sheets

A-A

B-B
(ROTATED)

OPPOSING FLOWS IN CHANNEL

SINGLE DIRECTION FLOW IN CHANNEL

PRESENT INVENTION

GT = GUIDE TUBES
20 = FUEL ROD

GT = GUIDE TUBES
20 = FUEL ROD

ALL FORCE VECTORS (WITHIN THE ASSEMBLY) ARE BALANCED

∴ <u>NO NET TORGUE</u>

PRESSURIZED WATER REACTOR FUEL ASSEMBLY SPACER GRID

FIELD OF THE INVENTION

The present invention relates to a nuclear fuel assembly for a pressurized water reactor, and in particular to a nuclear fuel rod spacer or spacer grids which are placed at predetermined distances along the height of the fuel assembly in order to provide lateral bracing and spacing, and to maintain the nuclear fuel rods in fixed positions.

BACKGROUND OF THE INVENTION

In a nuclear reactor, the reactor core contains nuclear fuel which is typically in the form of fuel rods grouped together in fuel assemblies. Groups of fuel assemblies are arranged into a matrix to form a core capable of controlled fission reaction.

Each fuel rod is typically a long member approximately 0.4 inches in diameter and 8 to 15 feet long containing fuel usually in the form of a stack of fuel pellets which are surrounded by tubular cladding. The fuel rods which make up an assembly are grouped together to form a plurality of longitudinally extending members which are supported by two parallel end plates, an upper and a lower tie plate. These plates are usually connected to one another by guide tubes or tie rods or other structural elements.

Each fuel assembly or bundle may also include nonfuel bearing members. Examples include guide tubes to form passageways for control rods which assist in controlling the rate of fission, instrumentation tubes for in-core instrumentation, spacer capture rods, and water rods to modify the neutron moderation in the assembly. The spaces between adjacent fuel rods create flow channels through which coolant and/or moderator can circulate. In light water reactors, the coolant and moderator is water. Lateral bracing and spacing of the fuel rods in the fuel assembly are provided by spacers or spacer grids. A typical fuel assembly for pressurized water reactor is described more fully in U.S. Pat. No. 5,787,142 which is hereby incorporated by reference.

The fuel assembly or bundle, whether in a pressurized water reactor, boiling water reactor, high temperature gas cooled reactor, or any other type of reactor, functions in part to maintain the fuel rods in a fixed position, ideally free of vibration and restrained from bowing or other lateral displacement during normal and other operating conditions. In addition, by maintaining the fuel rods in fixed positions, proper cooling and neutron moderation can be achieved. Devices that assist in maintaining the fuel rods in fixed positions in the fuel assembly or bundle and which thereby facilitate proper fuel cooling are spacers.

Spacers or spacer grids which provide lateral bracing are typically designed to allow differential axial expansion of the fuel rods. Springs incorporated in some spacer grids are most frequently used to permit some sliding of the fuel rods with respect to the spacer grids. In some of the designs, the spacer grid is free to move axially a small amount to accommodate minor changes in the axial length of the fuel rods during irradiation.

If spacers were to be rigidly connected to the fuel rods as well as to structural members of the fuel assembly, then relative axial movement due to rod growth and thermal expansion of adjacent rods could cause local fuel rod skewing and bowing.

By being positioned at regular intervals, spacers maintain rod-to-rod spacing along the length of the fuel assembly. Spacers are typically made of zirconium based alloy sheet material or sometimes from Inconel or stainless steel, and are built up from a relatively large number of different intricately shaped strips.

SUMMARY OF THE INVENTION

These and other objects of the invention are achieved by providing a spacer for nuclear fuel rods of a nuclear fuel assembly, comprising a plurality of sets of two horizontally extending substantially straight parallel grid strips, one of the two horizontally extending substantially straight parallel grid strips being substantially flat and a second one of the two horizontally extending substantially straight parallel grid strips having generally vertically extending undulations along its length forming tubular passages between the two horizontally extending substantially straight parallel grid strips to produce swirling motion of coolant, the plurality of sets of two horizontally extending substantially straight parallel grid strips arranged to intersect one another to form a lattice of polygonal shaped cells through which nuclear fuel rods extend and which support the fuel rods positioned asymmetrically within the cells.

In another embodiment of the present invention a nuclear fuel assembly for pressurized water reactors, the assembly having a plurality of elongated fuel rods supported between a lower tie plate positioned toward the bottom of the assembly and an upper tie plate positioned toward the top of the assembly, at least one spacer for positioning and retaining the fuel rods, the spacer comprising a plurality of sets of two horizontally extending substantially straight parallel grid strips, one of the two horizontally extending substantially straight parallel grid strips being substantially flat and a second one of the two horizontally extending substantially straight parallel grid strips having generally vertically extending undulations along its length forming tubular passages between the two horizontally extending substantially straight parallel grid strips to produce swirling motion of coolant, the plurality of sets of two horizontally extending substantially straight parallel grid strips arranged to intersect one another to form a lattice of polygonal shaped cells through which nuclear fuel rods extend and which support the fuel rods positioned asymmetrically within the cells.

DESCRIPTION OF THE ILLUSTRATIVE EMBODIMENTS

Figure 1:
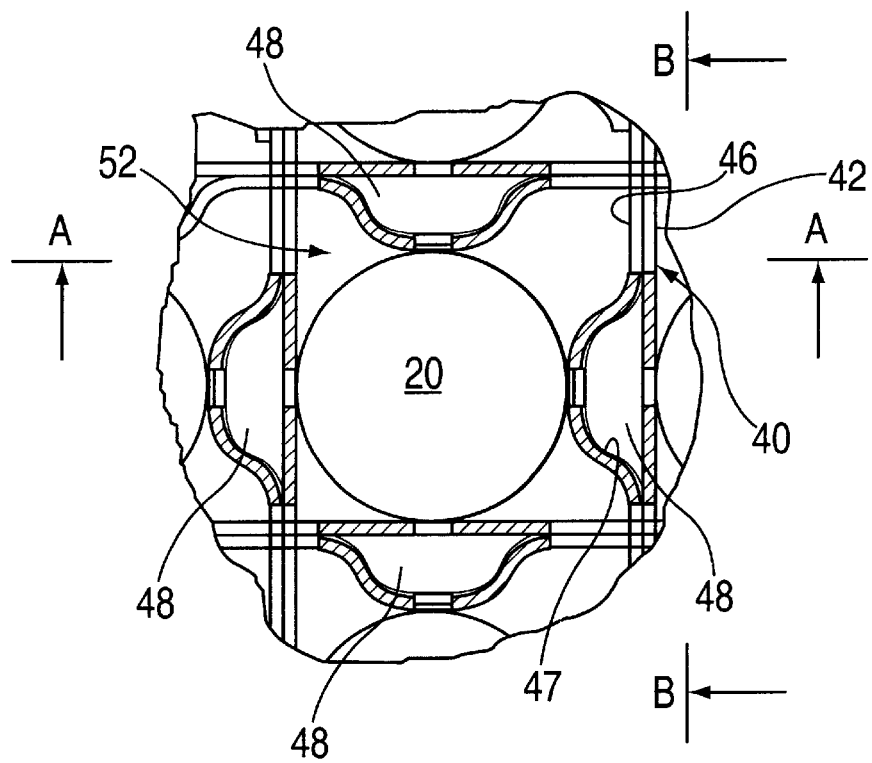
FIG. 1 shows a fuel rod within a spacer cell of the spacer in accordance with the present invention.
Figure 1A:
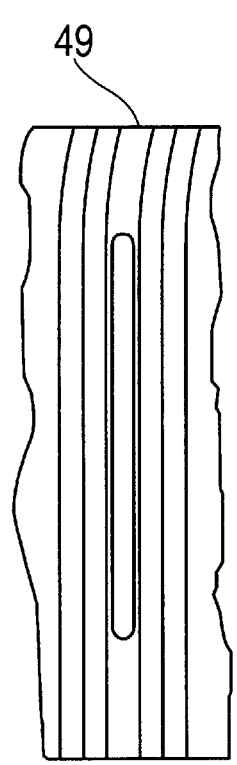
FIG. 1A is a sectional view of the spacer cell in FIG. 1.
Figure 1B:
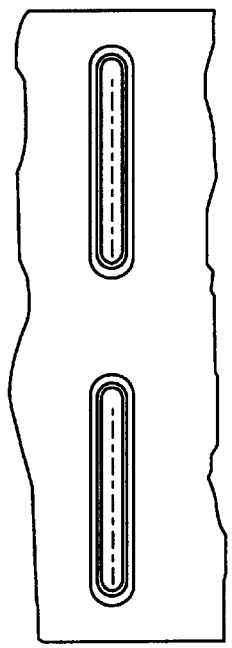
FIG. 1B is a sectional view of the spacer cell in FIG. 1.

Post-irradiation envelope measurements of some spacer designs indicate that the spacer side plates bow outwards during their incore residence time to the point where the spacer design envelope may be exceeded. The effect is most noticeable at high burnup. If severe enough and if it occurs in many assemblies, difficulties may occur when unloading or loading the core in that assemblies could get stuck and/or become difficult to extract or insert. "Growth" of the spacers can also impact the seismic behavior of the assemblies in the core due to closure of the gap between adjacent assemblies.

Reasons for the larger than expected growth or bow of the spacers are related to larger than expected growth or extension of the internal doublet strips that form the cells in some spacer designs.

Hydrogen pick-up from the corrosion reaction causes an increase in volume of the Zircaloy material typically used to form at least part of spacers resulting in growth. The oxide that forms on the Zircaloy strip material causes tensile stresses in the underlying metal, and hence tends to lengthen the spacer strips due to creep resulting from the tensile stress. The growth or extension of the spacer strips due to these causes can be alleviated by the use of zirconium alloys with improved corrosion behavior.

Measurements and calculations indicate that the sum of the effects of the corrosion related causes cannot account fully for the observed bulging of the spacer side plates during irradiation.

Recent measurements during fabrication of assemblies have indicated that during loading of the rods in the assembly (or spacer), a certain amount of side plate bulging takes place. The reason for this is that in the design utilizing doublet spacer strips, the strips, when squeezed down on their springs which occurs when a rod is pushed into a cell, will increase in length because the undulations in the spacer strips are being flattened slightly.

Although the effect in each spacer cell is slight, the cumulative effect of approximately 14 to 18 of the fuel rod cells causes the spacer side plates to measurably bulge outwards. An improvement in accordance with the present invention is to provide for at least some straight strips without undulations that connect the opposite sides of a spacer. Straight strips would prevent the side plates of the spacer from moving apart. At the same time, the highly desirable feature of particular spacer designs, namely the curved flow channel formed by the doublets separating adjacent fuel rods, is maintained.

A typical prior art design with four channels formed by doublets and surrounding a fuel rod provides for four springs in each spacer cell. The contact point of the four springs in each cell touch on the fuel rod in a single plane. This allows the fuel rod to pivot in each cell, albeit a small amount. If the fuel rod is prone to bowing from any cause such as a small amount of initial bow, uneven heat flux or fissioning within the fuel column, buckling forces, etc., such bowing will be exacerbated by the fact that the rod can pivot in the spacer cell. A spacer or cell design that prevents pivoting of the rod in a single plane by supporting it by dimples that are spaced apart along the rod length or by supporting the rod along some length would tend to counteract rod bow and hence be desirable.

Figure 2:
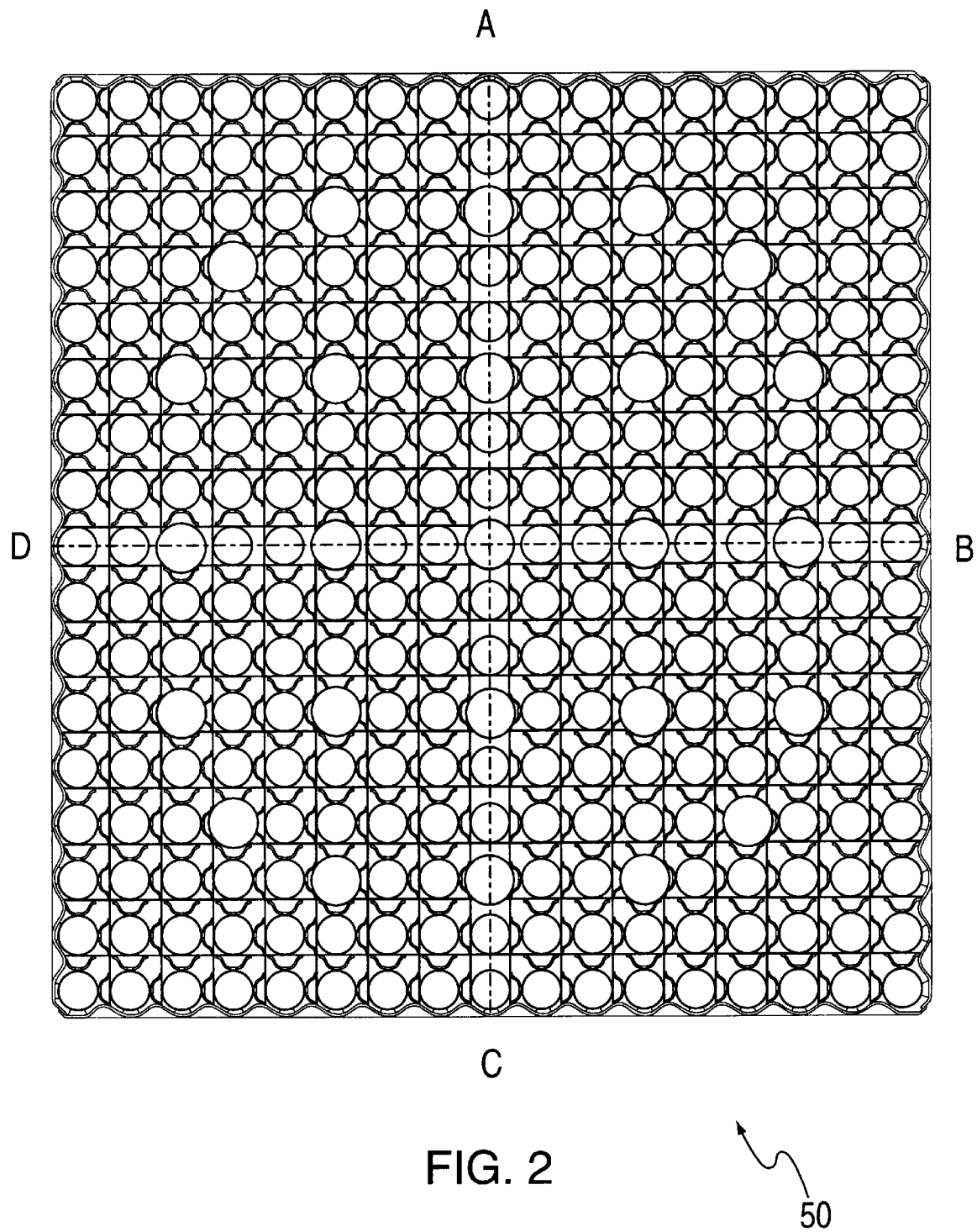
FIG. 2 shows a top view of a PWR spacer for a 17×17 array of fuel rods showing positions for fuel rods and larger openings for guide tubes in accordance with the present invention.

In accordance with the present invention, a PWR spacer 50 is disclosed where the majority of the doublets 40 consist of one substantially flat and straight strip 42 and one strip substantially straight and with undulations 46. Each undulation 47 forms a flow channel 48 which are located between adjacent fuel rods and the majority of fuel rods is surrounded by four such flow channels. The arrangement of a fuel rod 20 within a spacer cell 52 is shown in FIG. 1. The rod is held in position by flat straight spacer strips 42 on two sides and by two flow channel springs formed in undulations which function in the same manner as the springs in the spacer described more fully in U.S. Pat. No. 4,726,926 which is hereby incorporated by reference. It is noted from FIG. 2 that the fuel rod is positioned within the cell, asymmetrically, rather than being positioned in the center of the cell. The arrangement of guide tubes, fuel rods, and spacer strips for a 17×17 pressurized water reactor fuel assembly spacer is shown in FIG. 2. Symmetry within the spacer has been maintained by having the spring strips face outward and the flat strips face inward in each spacer quadrant. A double spring strip is provided near the center of the spacer for the 17×17 array of fuel rods. The present invention can be used with virtually any other array of fuel rods.

The present invention has several advantages over the prior art. Straight and essentially flat strips between nearly all the rods connect opposite sides of the spacer which prevent bulging out of the side plates during fabrication and reduces bowing-out during irradiation. This also enhances the location of the rods on a precise pitch as determined by the straight strips. This is an improvement over the prior art designs where the fuel rod is held between four springs one on each side of the spacer cell and the rod-to-rod pitch may vary because not all springs in a cell may be compressed the exact same amount. However, as contrasted to the prior art design, the fuel rods in the present invention are supported along nearly the full spacer height on two sides of the cell where they touch the straight spacer strips. This thereby eliminates pivoting of the fuel rods and reduces rod bow during irradiation. A further improvement over prior art designs is achieved by providing curved nozzles 49 with particular predetermined directions on the flow channels 48 formed by the spacer strip as more fully described below.

Figure 3:
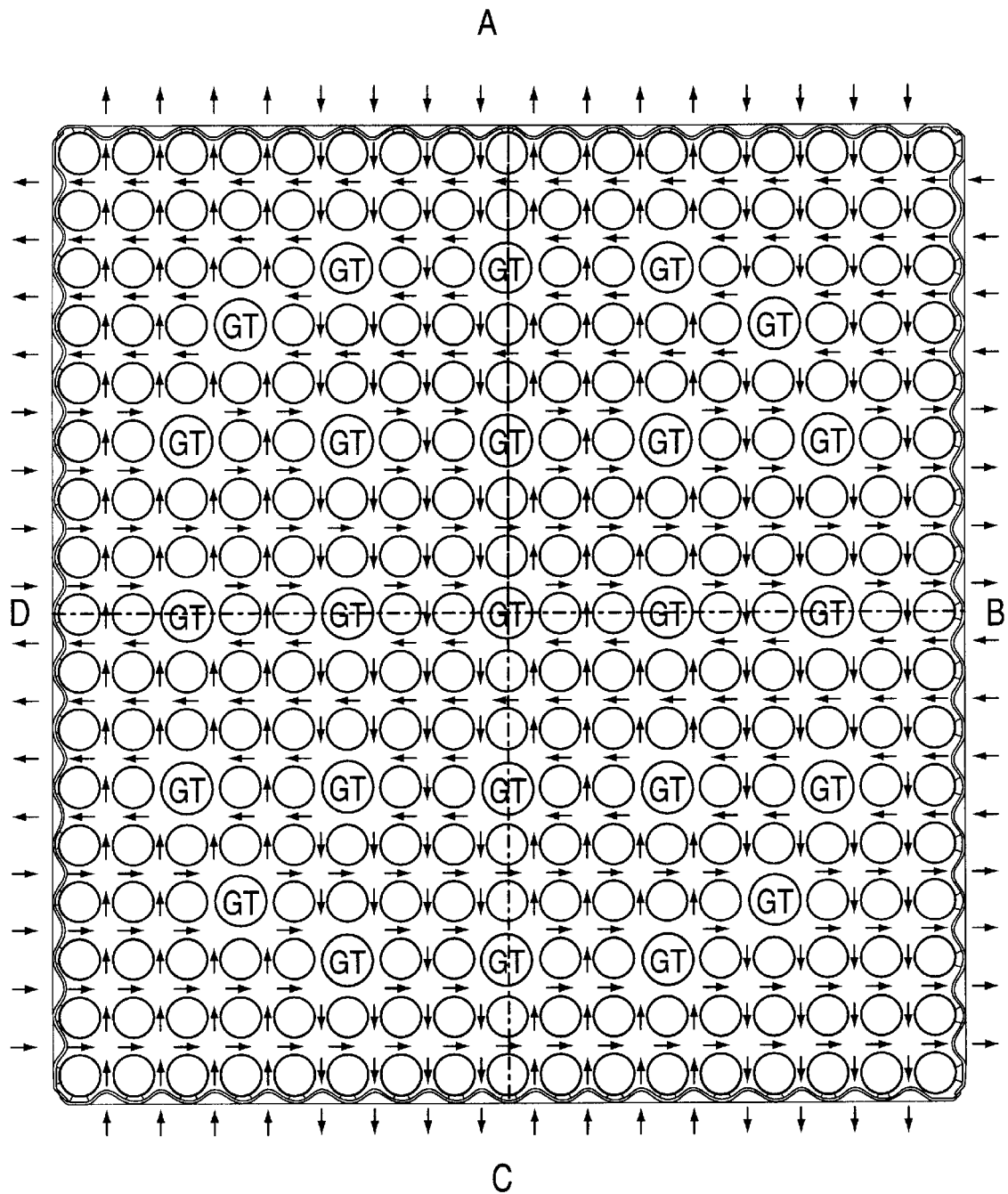
FIG. 3 shows the direction of the nozzles.
Figure 4:
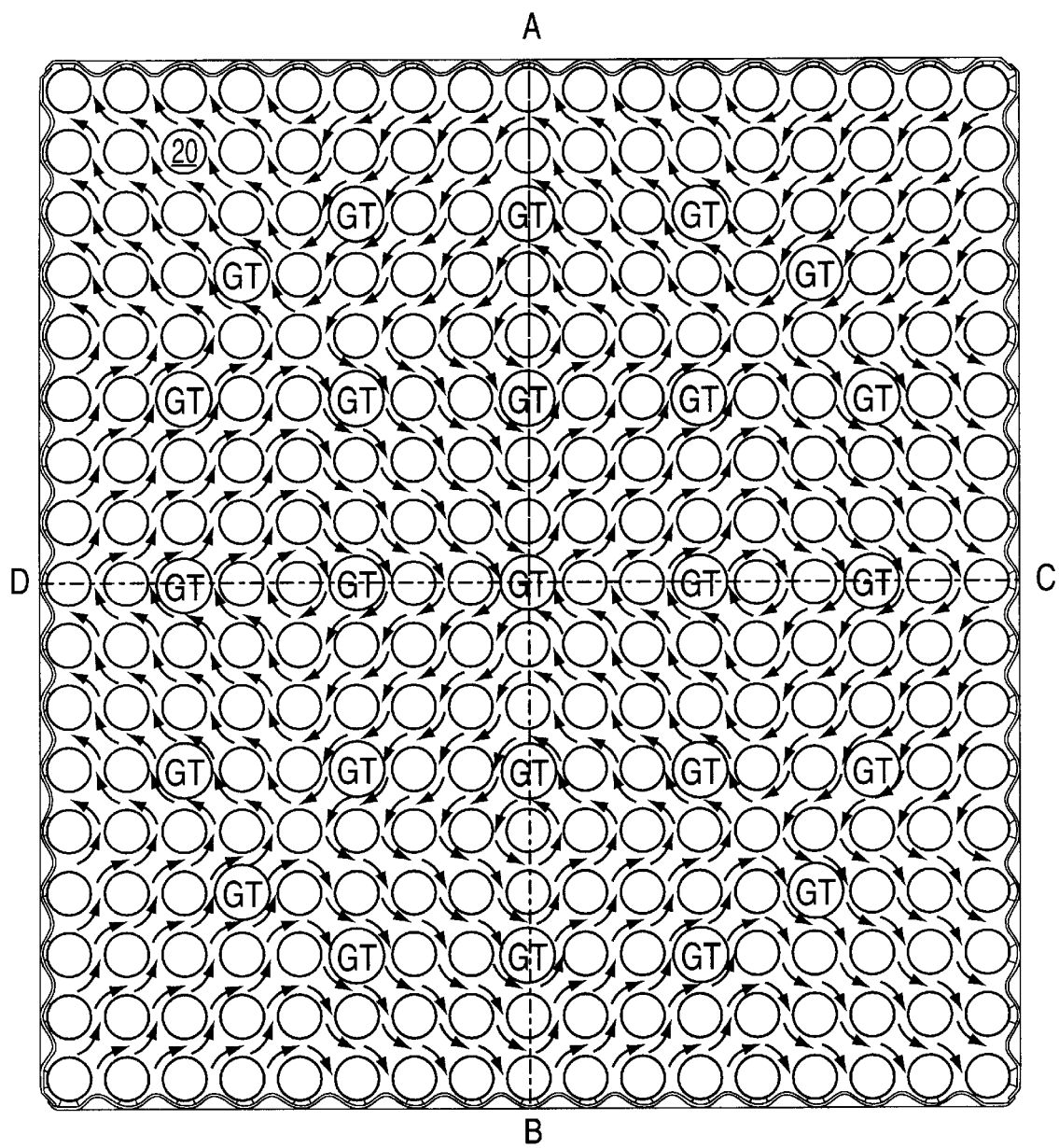
FIG. 4 shows the direction of coolant between the fuel rods and is mostly in diagonal direction due to pointing the nozzles in the directions shown in FIG. 3.
Figure 5:
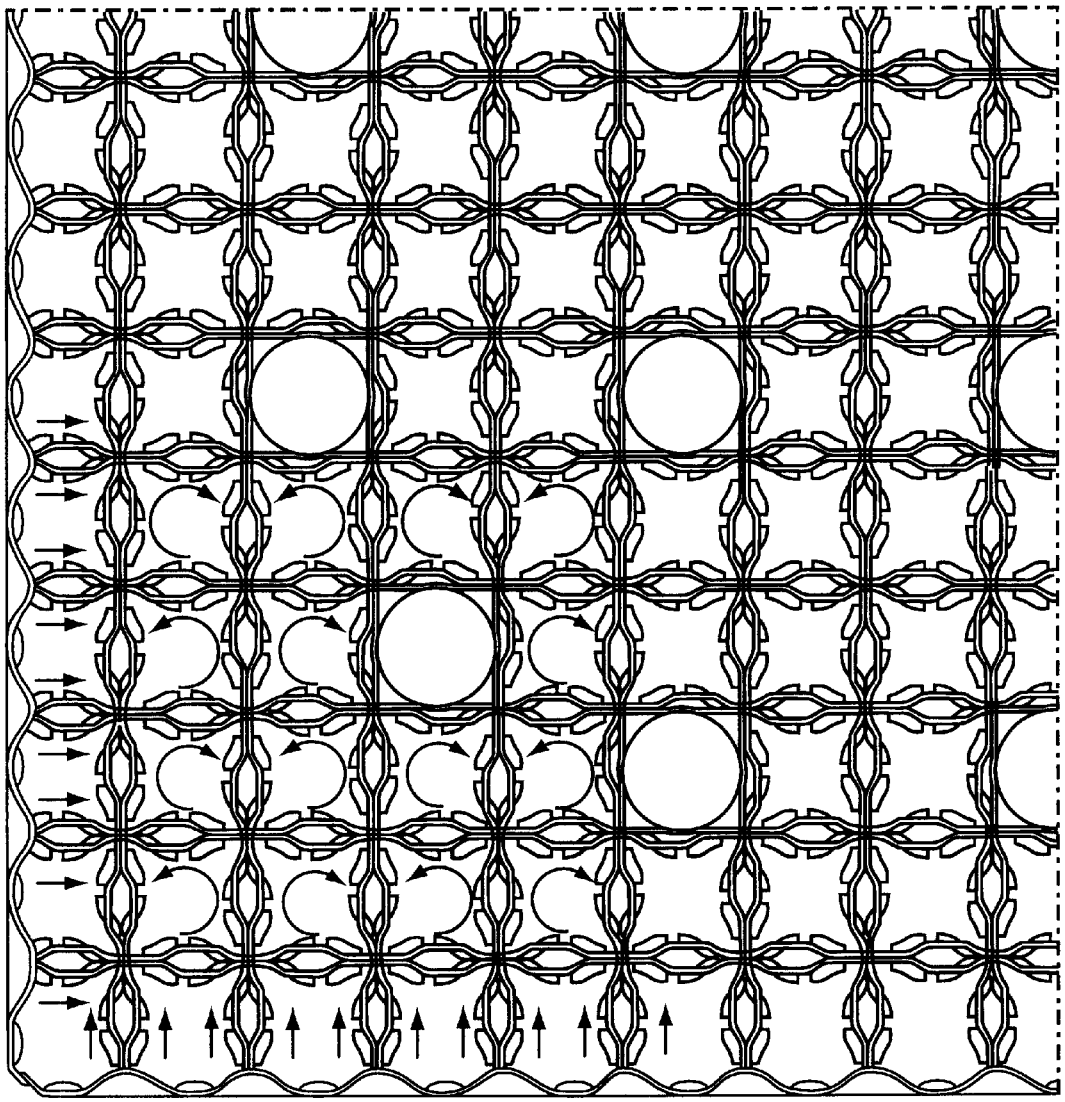
FIG. 5 shows the guide tubes and the flow of coolant circulating around the fuel rods which have been omitted for clarity of illustration.
Figure 6A:
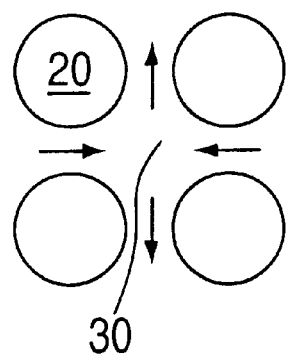
FIG. 6A depicts the prior art design coolant flow between fuel rods.
Figure 6A:
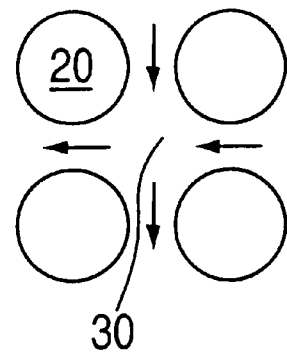
Figure 6A:
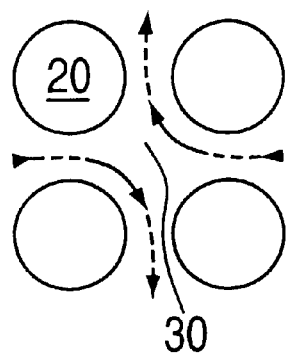
Figure 6B:
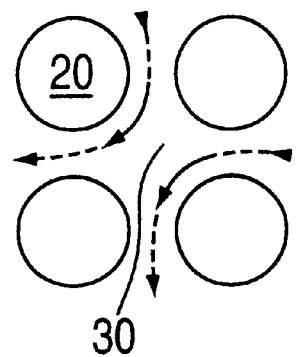
FIG. 6B depicts the coolant flow in the spacer segment of the present invention.

The direction of the nozzles in accordance with the present invention is shown in FIG. 2 and in FIG. 3 showing the spacer having sides designated "A", "B", "C", "D". The nozzles of an individual doublet all point in the same direction. As indicated in FIG. 3, going from left to right across the spacer, there are four doublets with nozzles pointing towards side A as indicated by the direction of arrows, followed by four doublets pointing towards side B, four more doublets with nozzles pointing towards side A and four more doublets with nozzles pointing towards side C. This same pattern occurs for the doublets that connect side B with side D of the spacer in the figures. By pointing the nozzles in these directions, the resulting flow of coolant between the rods is generally in a diagonal direction within the array of rods which is indicated in FIG. 4. In prior art designs, coolant flow circulates around each fuel rod as shown in FIG. 5 depicted by the arrows. There is a major difference between the prior art design shown in FIG. 6A and the preset invention shown in FIG. 6B. In both designs, two coolant streams shown as arrows enter a flow channel 30 formed between four adjacent rods arranged in a square array and two streams leave each flow channel 30. In prior art designs, there are opposing flows within such flow channels which will cause significant turbulence. In the present invention shown in FIG. 6B, all the coolant within a flow channel 30 flows in the same direction, resulting in less turbulence and more effective stripping of the water film on the rod surfaces.

Figure 7:
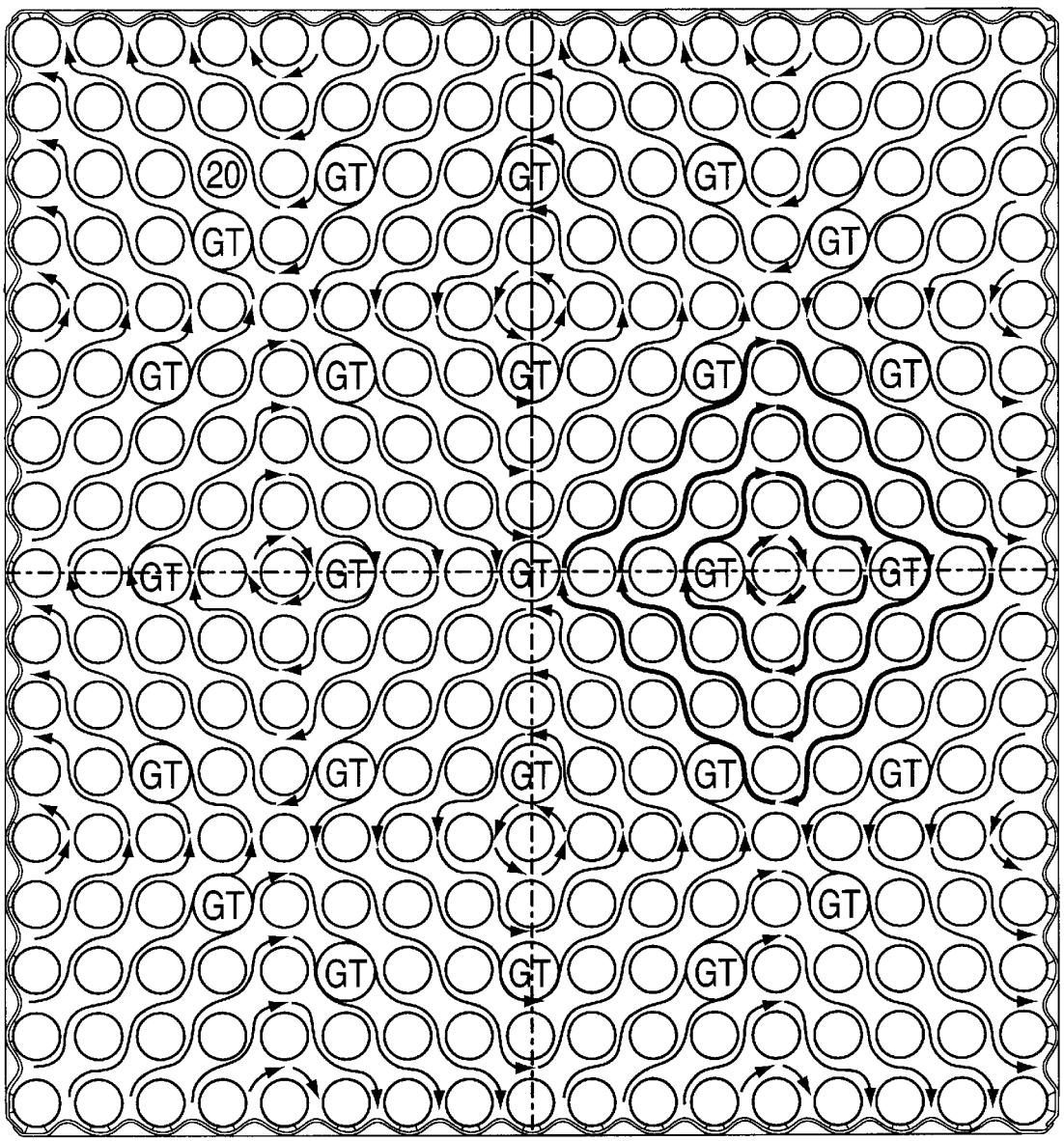
FIG. 7 shows the coolant flow direction within a spacer of a fuel assemby.
Figure 8:
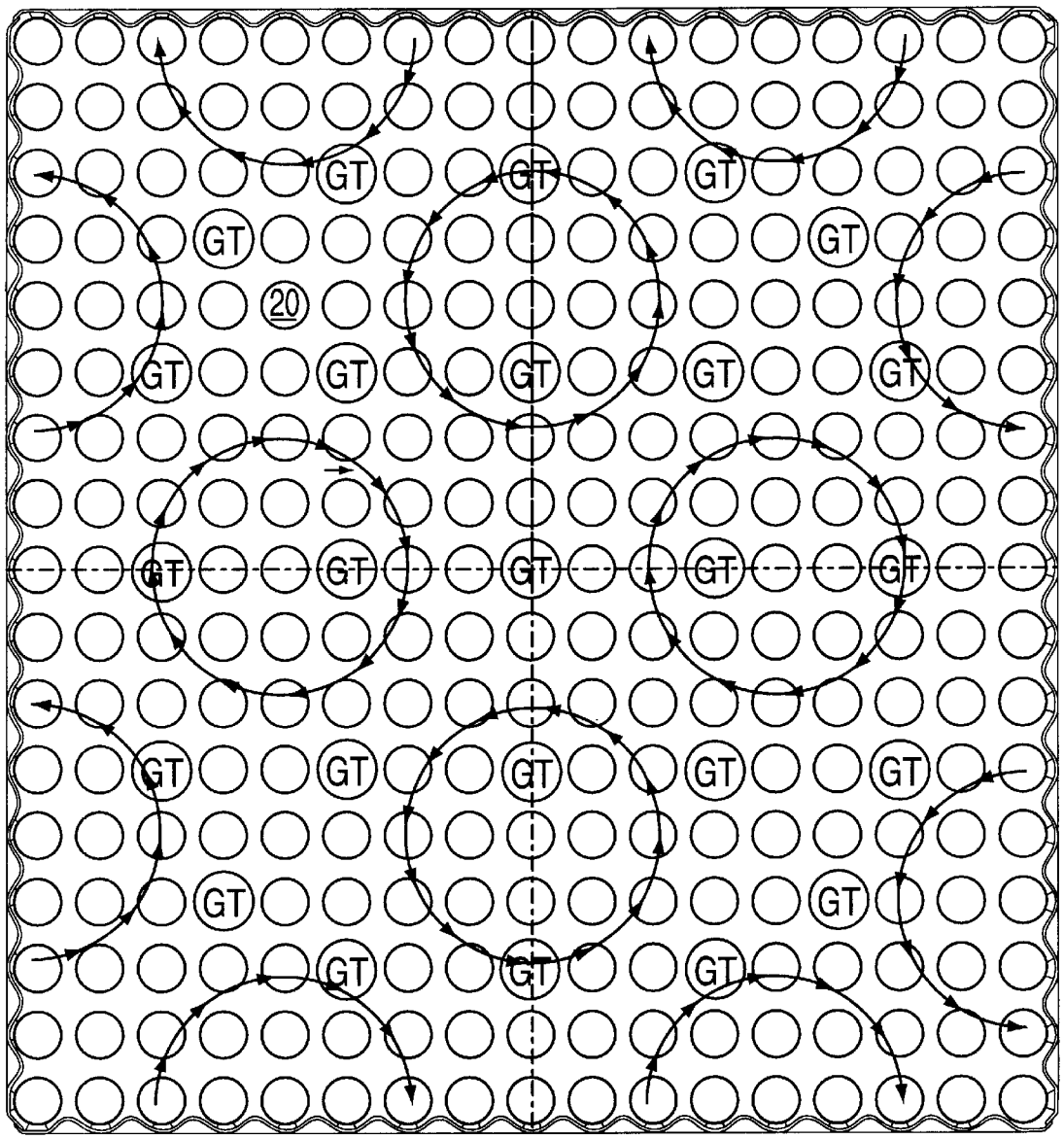
FIG. 8 depicts the flow cells within a fuel assembly.

Within an assembly, the coolant flow is in directions depicted by arrows as indicated in FIG. 7. The coolant circulates within portions of the assembly in diagonal directions, which in their entirety result in a generally circular flow pattern, one of which is indicated by the heavy outlined arrows in FIG. 7. FIG. 8 shows these flow areas within an assembly. As shown, some of the coolant is forced to leave the assembly and thereby enter an adjacent assembly, and at the same time, some coolant must enter the assembly from an adjacent assembly. Nuclear fuel assemblies are placed in the reactor core either all facing in the same direction or can be rotated by 180 degrees. In this manner, flow between adjacent assemblies is accomplished. However, an assembly rotated 90 or 270 degrees with respect to an adjacent assembly will impede the coolant flows into and out of the adjacent assemblies.

Figure 9:
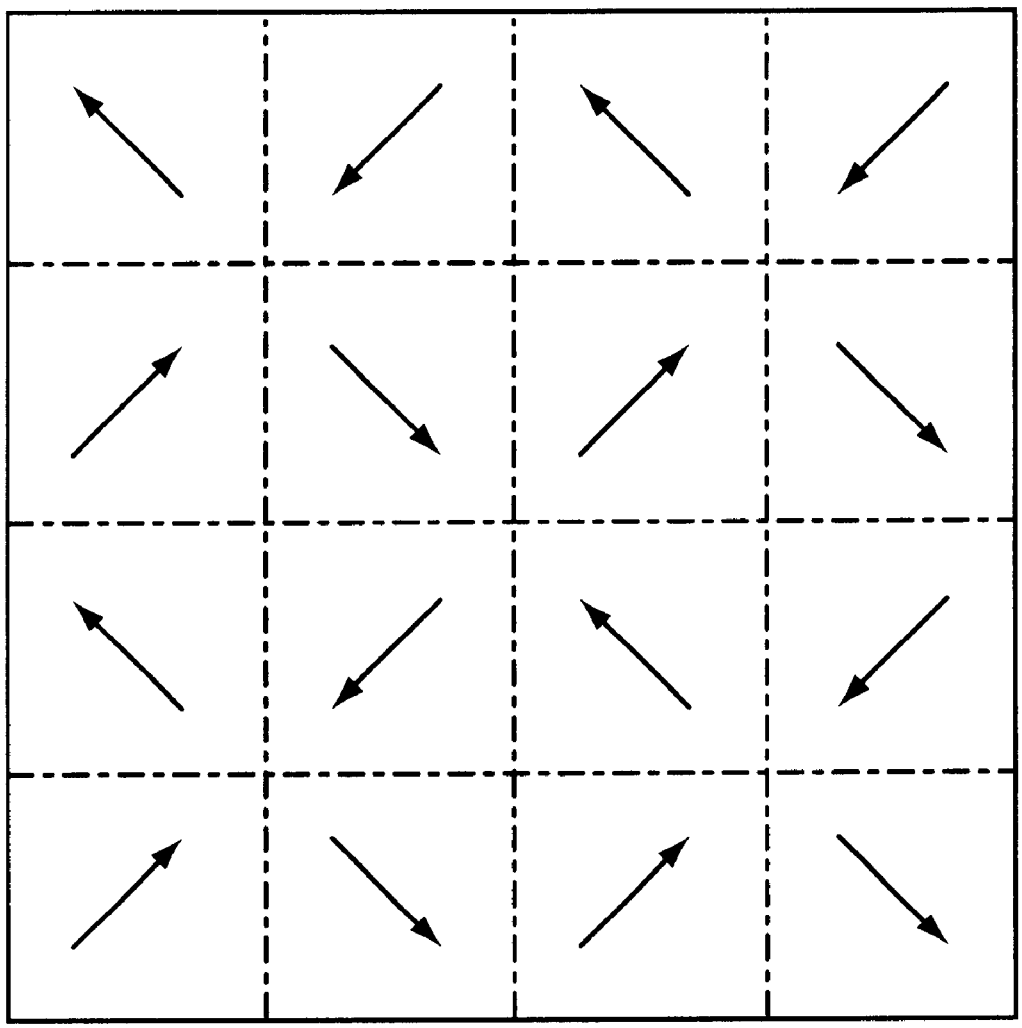
FIG. 9 is a net force diagram of the flow force vectors.

The flow of coolant across the fuel rods will set up lateral forces, which if not properly balanced, could cause assembly torque and distortion and in turn could lead to fretting and possibly assembly bowing. Inspection of the resulting force vectors due to coolant flow in diagonal directions shows that the present invention results in properly balanced forces with the result that there is no net torque set up by the coolant flow. This is shown in FIG. 9.

The present invention also results in an improvement in departure from nucleate boiling. Thus, in accordance with the present invention, the spacer incorporating straight spacer strips will, regardless of how the flow nozzles are directed, have the following advantageous features: maintain spacer envelope without undue bowing-out of the side plates, prevent fuel rod pivoting, and hence maintain rod straightness and provide accurate rod-to-rod pitch. In a preferred embodiment the spacer is made of a zirconium alloy with corrosion resistant properties.

While the present invention has been particularly shown and described with reference to preferred embodiments thereof, it will be understood by those skilled in the art that various changes in form and details may be made therein without departing from the spirit and scope of the invention.

What is claimed:

1. A spacer for nuclear fuel rods of a nuclear fuel assembly comprising:

a plurality of sets of two horizontally extending parallel grid strips, a first of the two horizontally extending parallel grid strips being substantially flat and a second of the two horizontally extending parallel grid strips having undulations along its length to form both a vertical flow channel between the first of the two horizontally extending parallel grid strips and the second of the two horizontally extending parallel grid strips and a nozzle connected to the vertical flow channel, the nozzle positioned to produce a swirling motion of coolant and to have non-opposing flow paths in flow channels, the plurality of sets of two horizontally extending parallel grid strips arranged to intersect one another to form a lattice of polygonal shaped cells through which nuclear fuel rods extend and which support the fuel rods positioned asymmetrically within the cells.

2. A nuclear fuel assembly for pressurized water reactors, the assembly having a plurality of elongated fuel rods supported between a lower tie plate positioned toward the bottom of the assembly and an upper tie plate positioned toward the top of the assembly; at least one spacer for positioning and retaining the fuel rods, the spacer comprising:

a plurality of sets of two horizontally extending parallel grid strips, a first of the two horizontally extending parallel grid strips being substantially flat and a second of the two horizontally extending parallel grid strips having undulations along its length to form both a vertical flow channel between the first of the two horizontally extending parallel grid strips and the second of the two horizontally extending parallel grid strips and a nozzle connected to the vertical flow channel, the nozzle positioned to produce a swirling motion of coolant and to have non-opposing flow paths in flow channels, the plurality of sets of two horizontally extending parallel grid strips arranged to intersect one another to form a lattice of polygonal shaped cells through which nuclear fuel rods extend and which support the fuel rods positioned asymmetrically within the cells.

* * * * *